Figure 20:
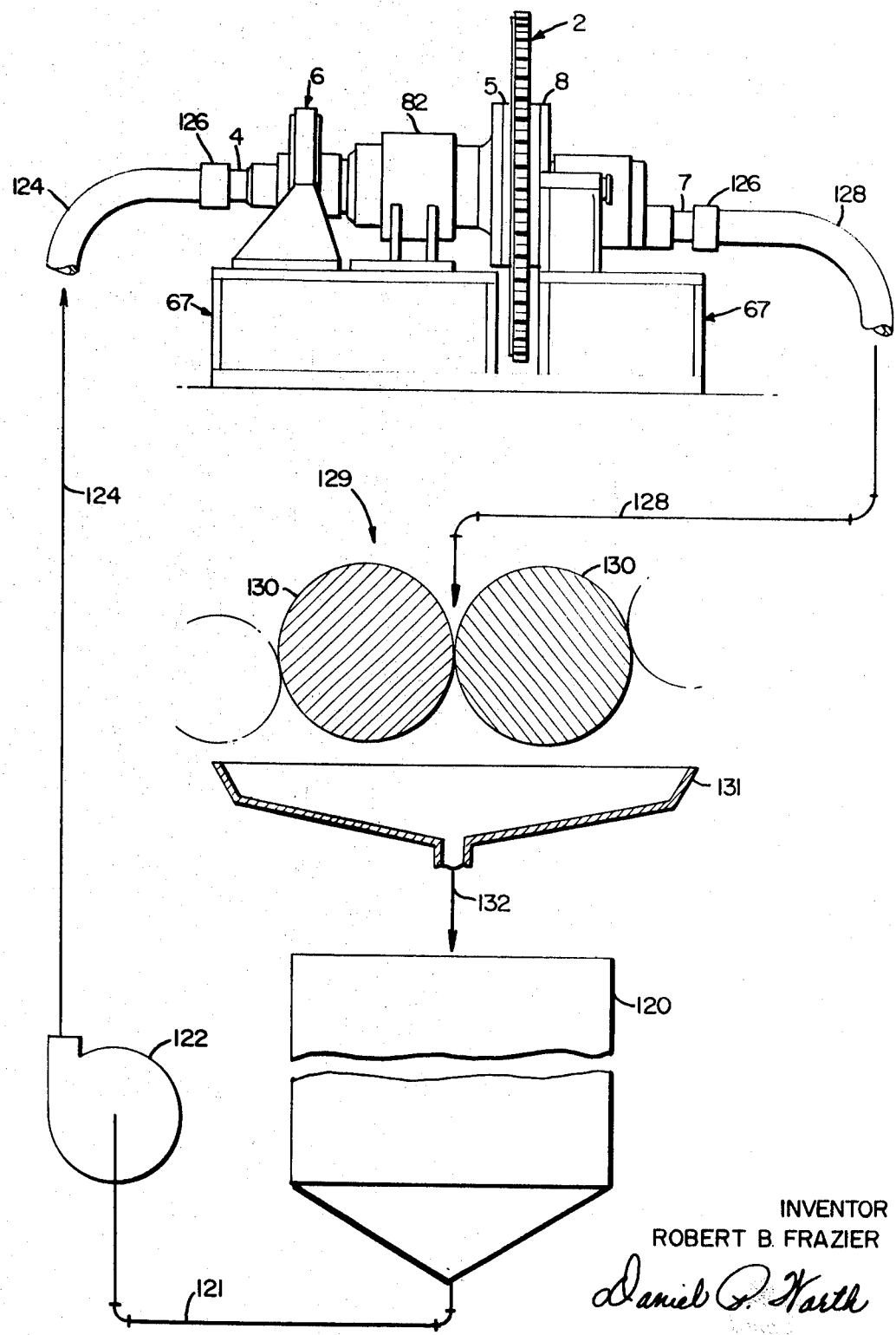

United States Patent

[11] 3,625,361

[72] Inventor Robert B. Frazier
 Pasadena, Tex.
[21] Appl. No. 756,542
[22] Filed Aug. 30, 1968
[45] Patented Dec. 7, 1971
[73] Assignee U.S. Plywood-Champion Papers Inc.
 Hamilton, Ohio

[54] FILTERING APPARATUS AND METHOD
 14 Claims, 22 Drawing Figs.
[52] U.S. Cl. .................................................. 210/77,
 210/82, 210/391
[51] Int. Cl. .................................................. B01d 33/24
[50] Field of Search .......................................... 210/77,
 330, 391, 398, 446, 447

[56] References Cited
UNITED STATES PATENTS

| | | | |
|---|---|---|---|
| 519,565 | 5/1894 | Bommarius .................. | 210/391 |
| 943,908 | 12/1909 | Bailey et al. .................. | 210/398 X |
| 1,826,361 | 10/1931 | McNeal ........................ | 210/398 X |
| 2,382,656 | 8/1945 | Obenshain et al. ........... | 210/398 X |

Primary Examiner—Samih N. Zaharna
Attorney—Daniel P. Worth

ABSTRACT: A filtering apparatus and method wherein a filter screen is moved through a liquid stream that is passing through closed conduits while liquidtight sliding seals are maintained between the conduit and screen.

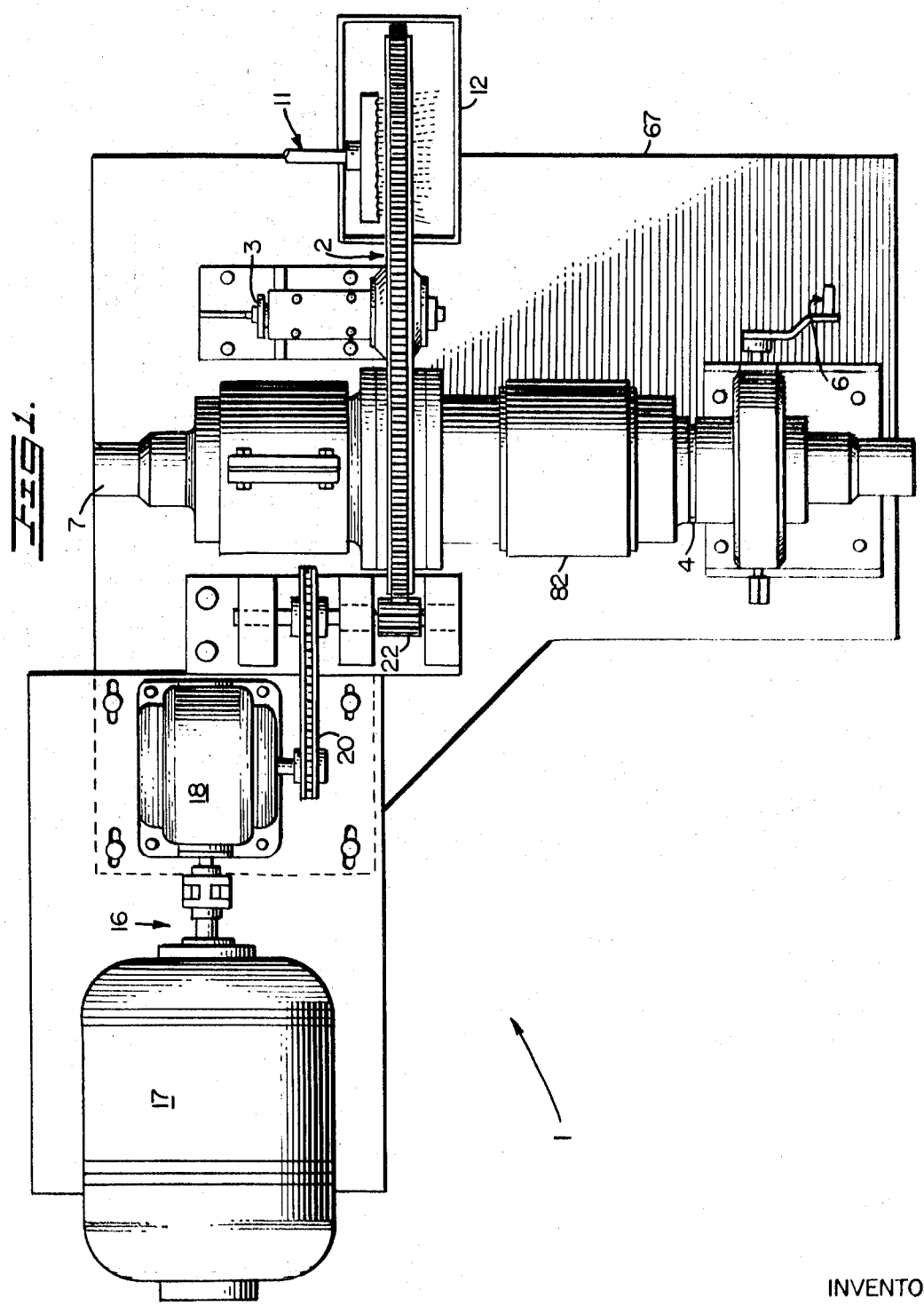

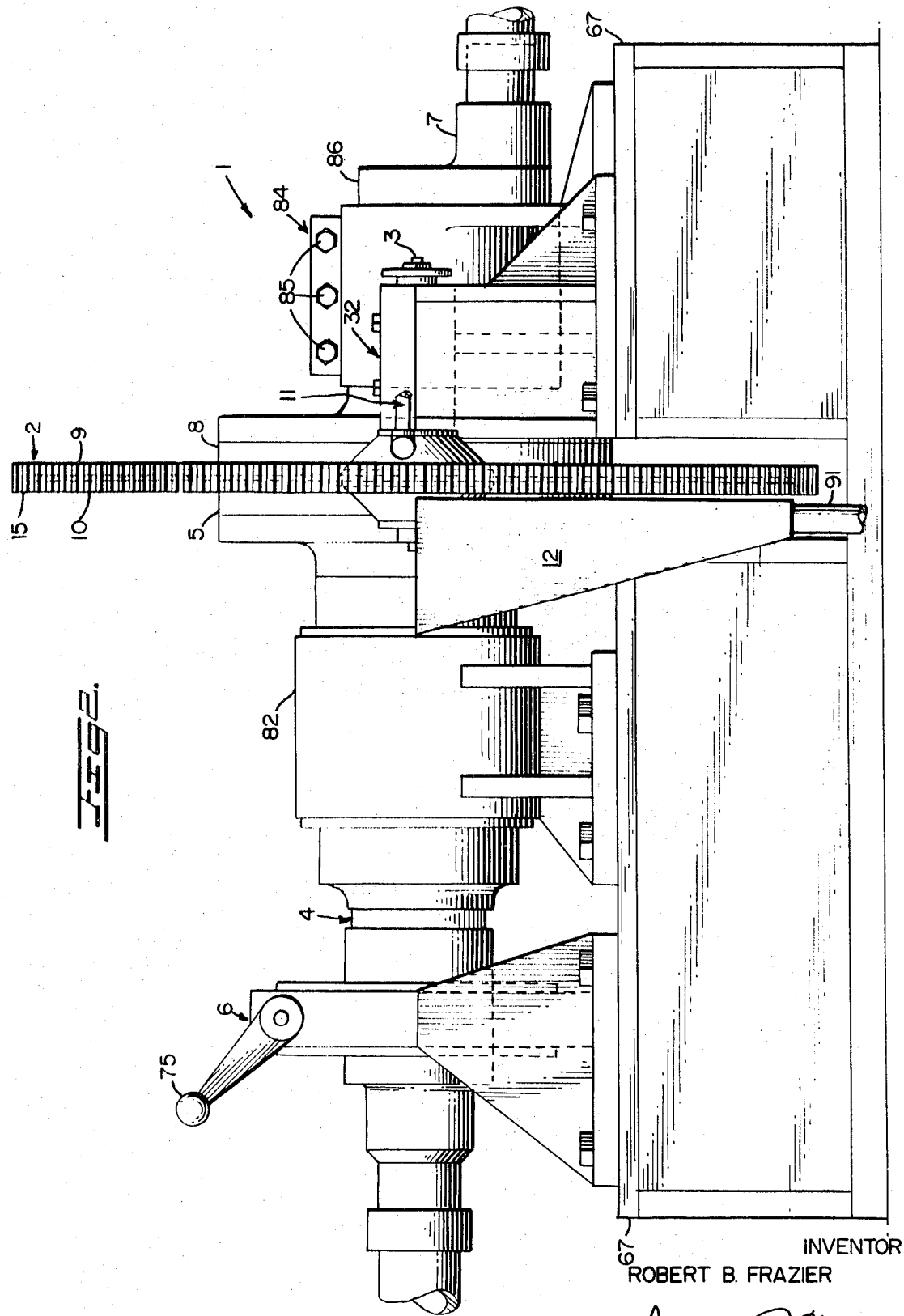

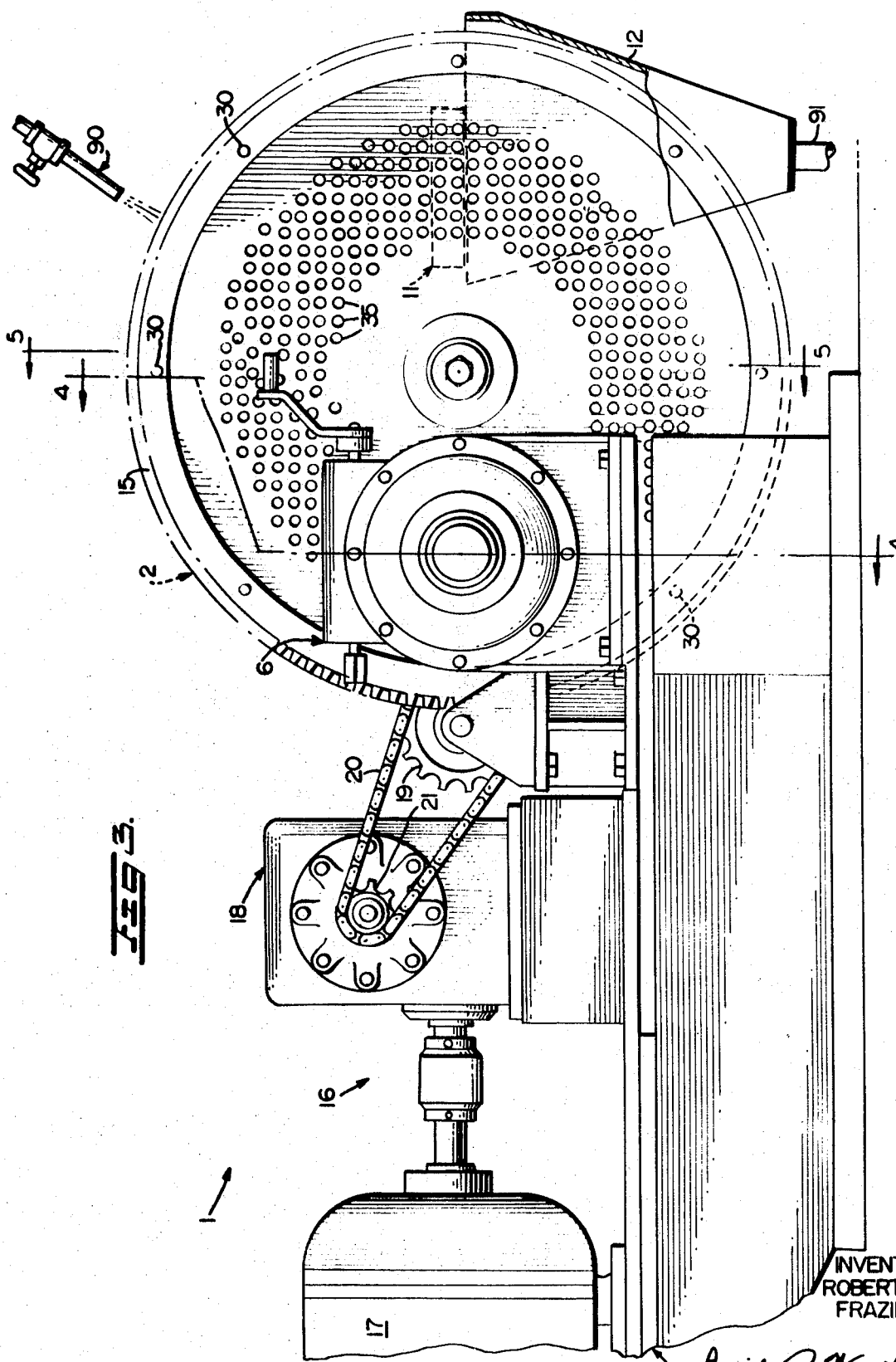

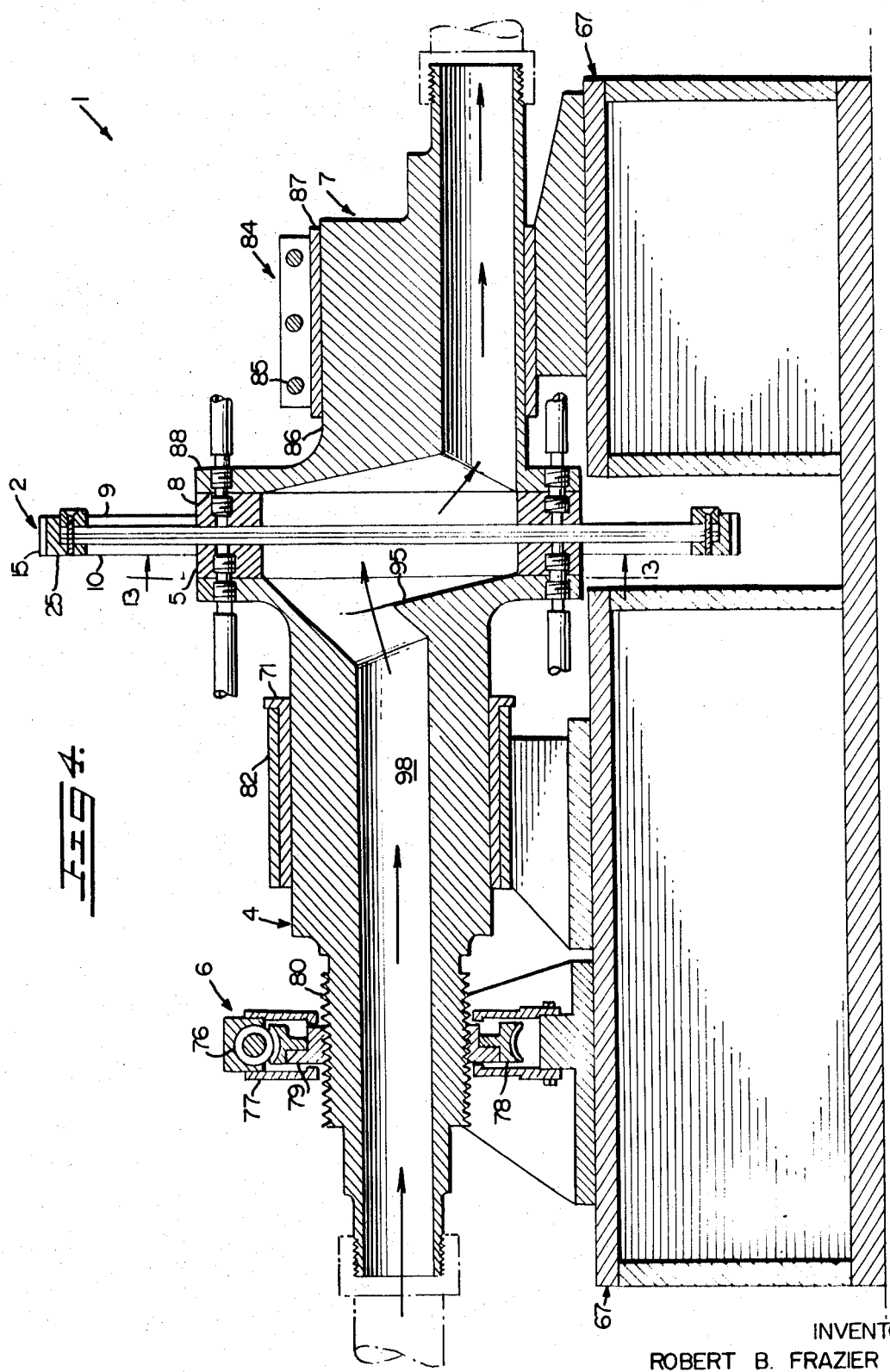

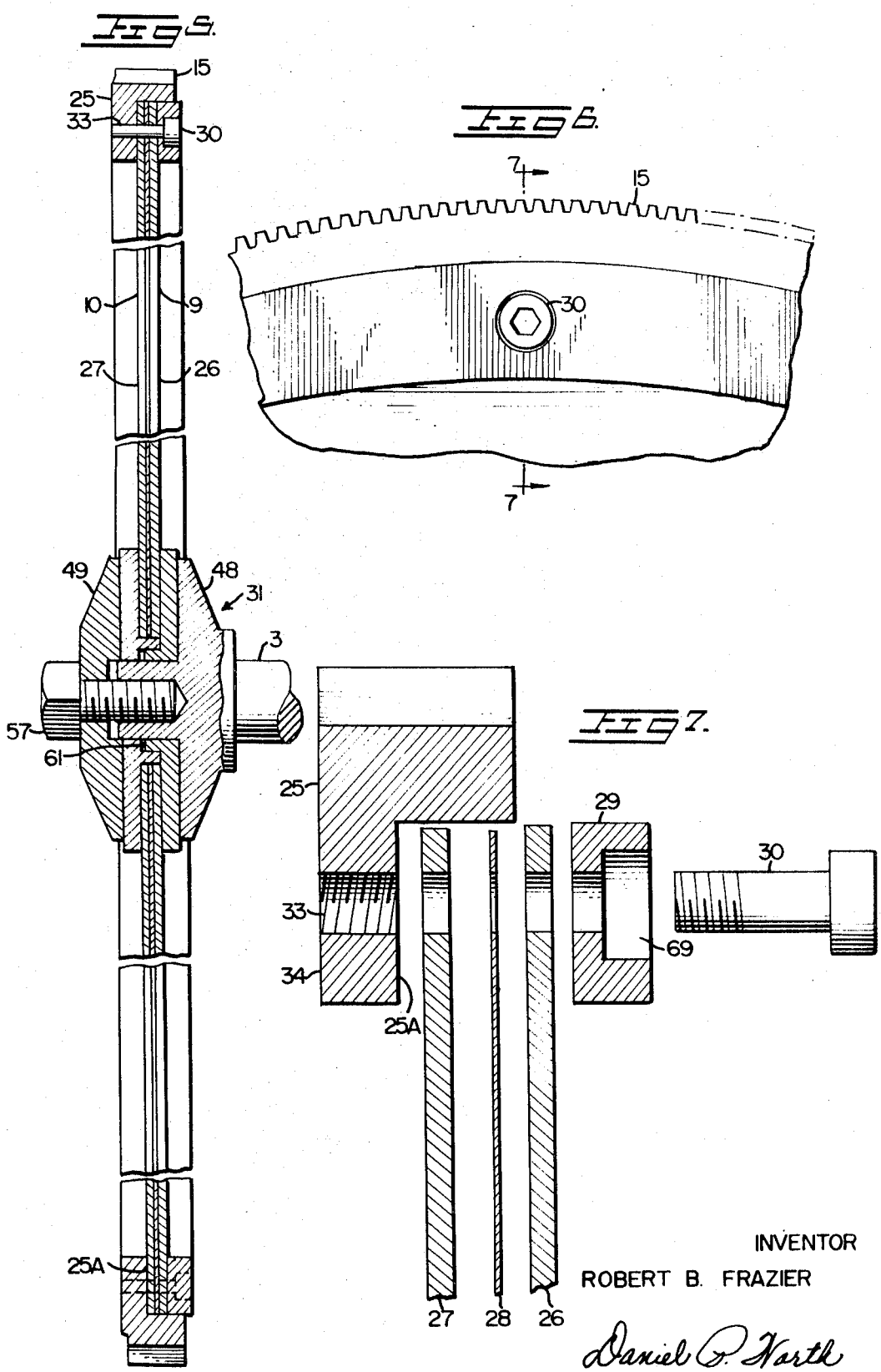

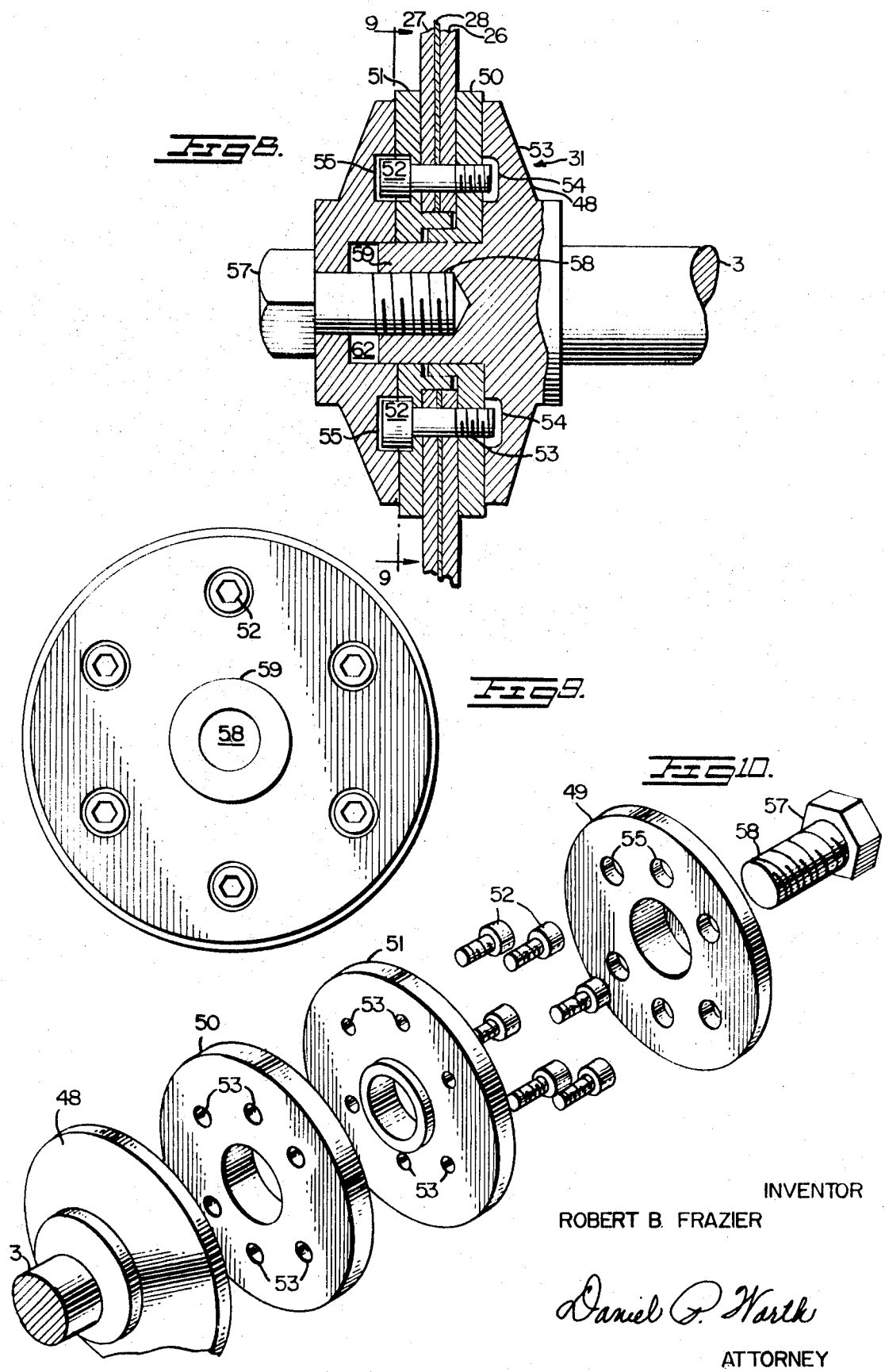

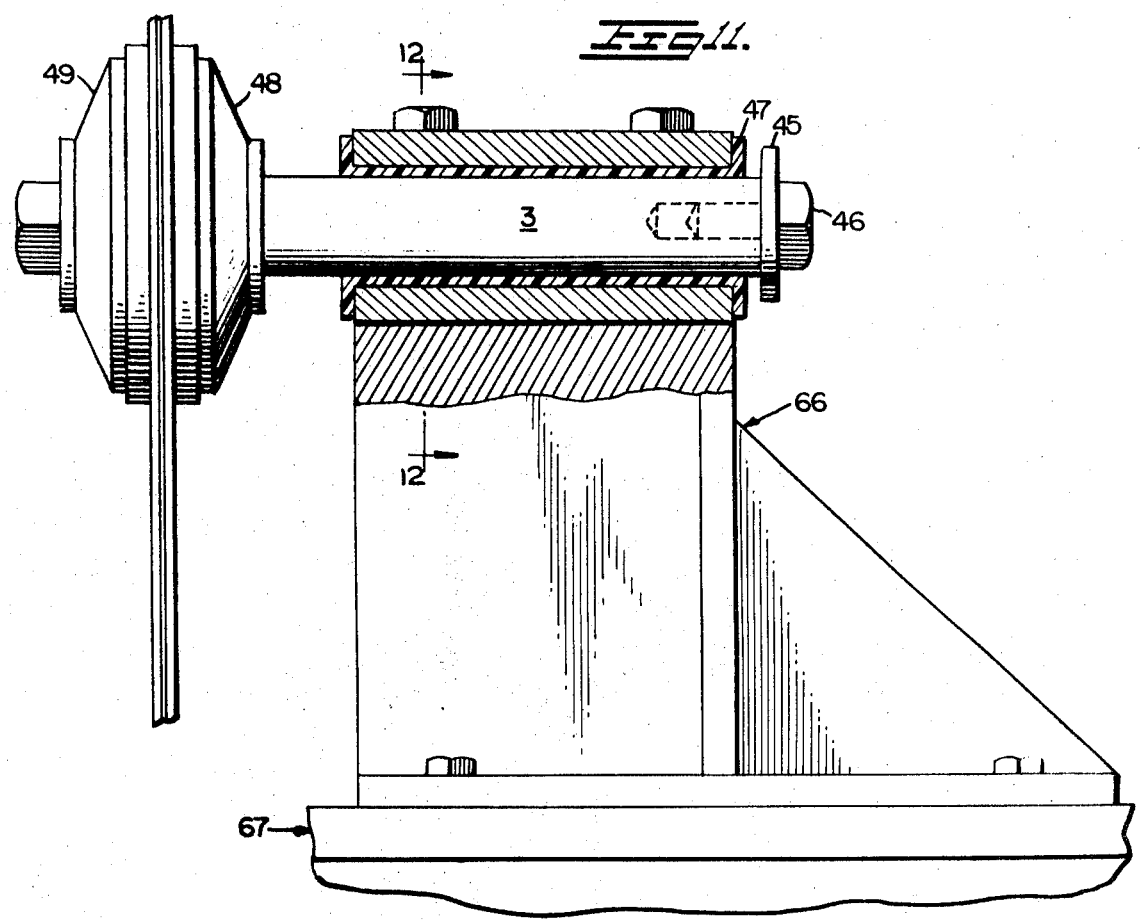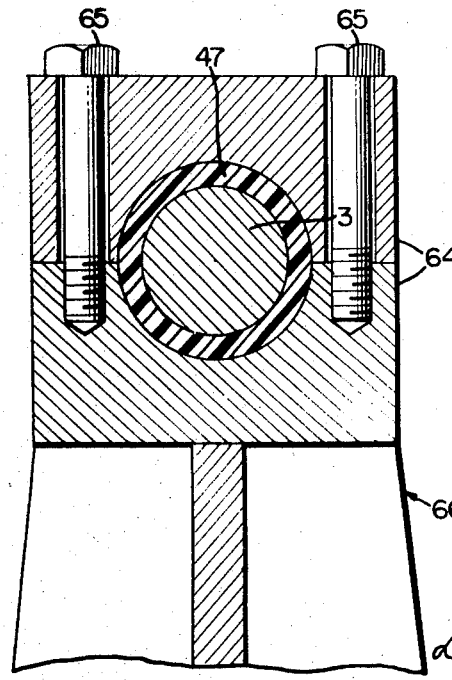

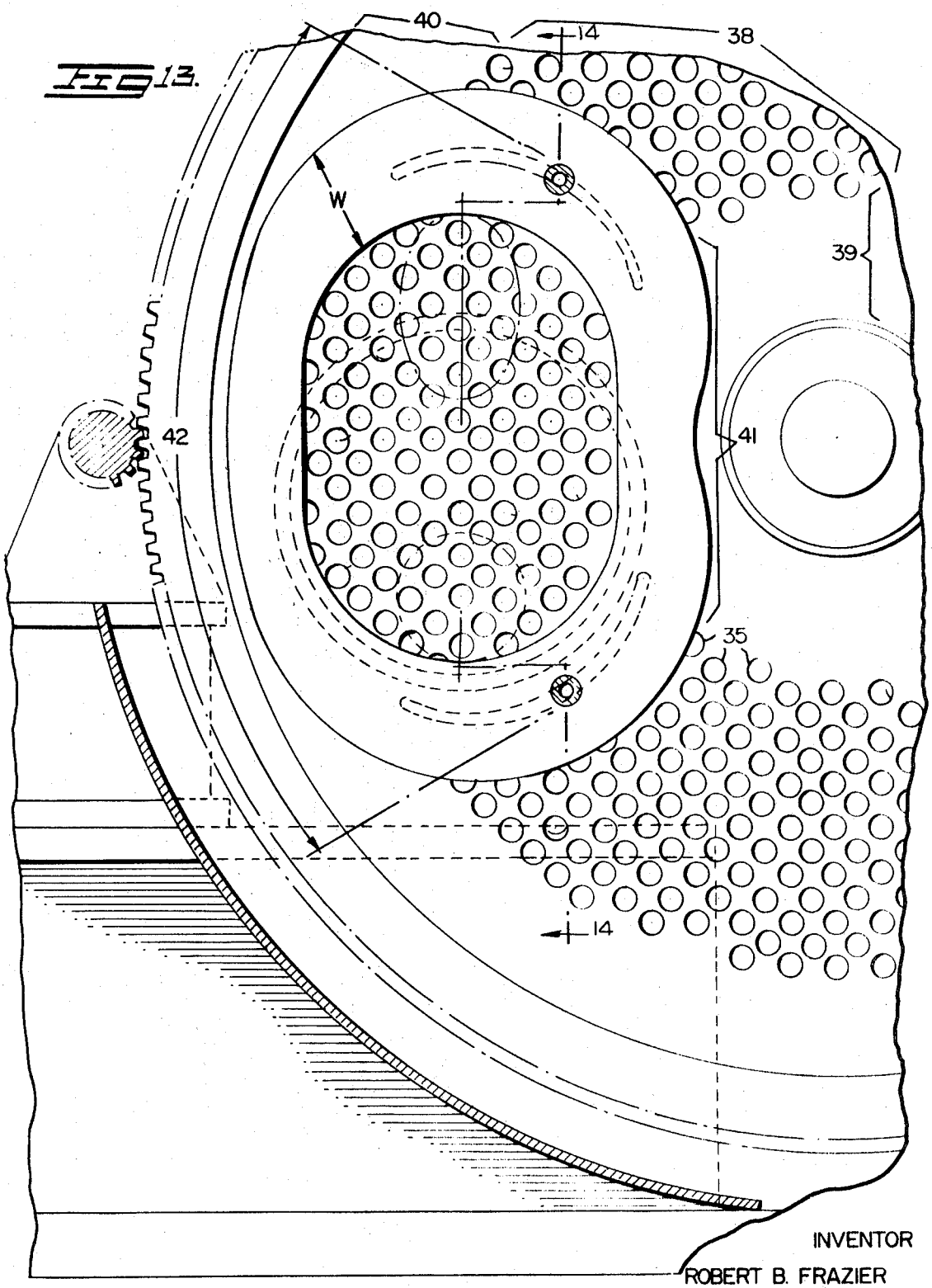

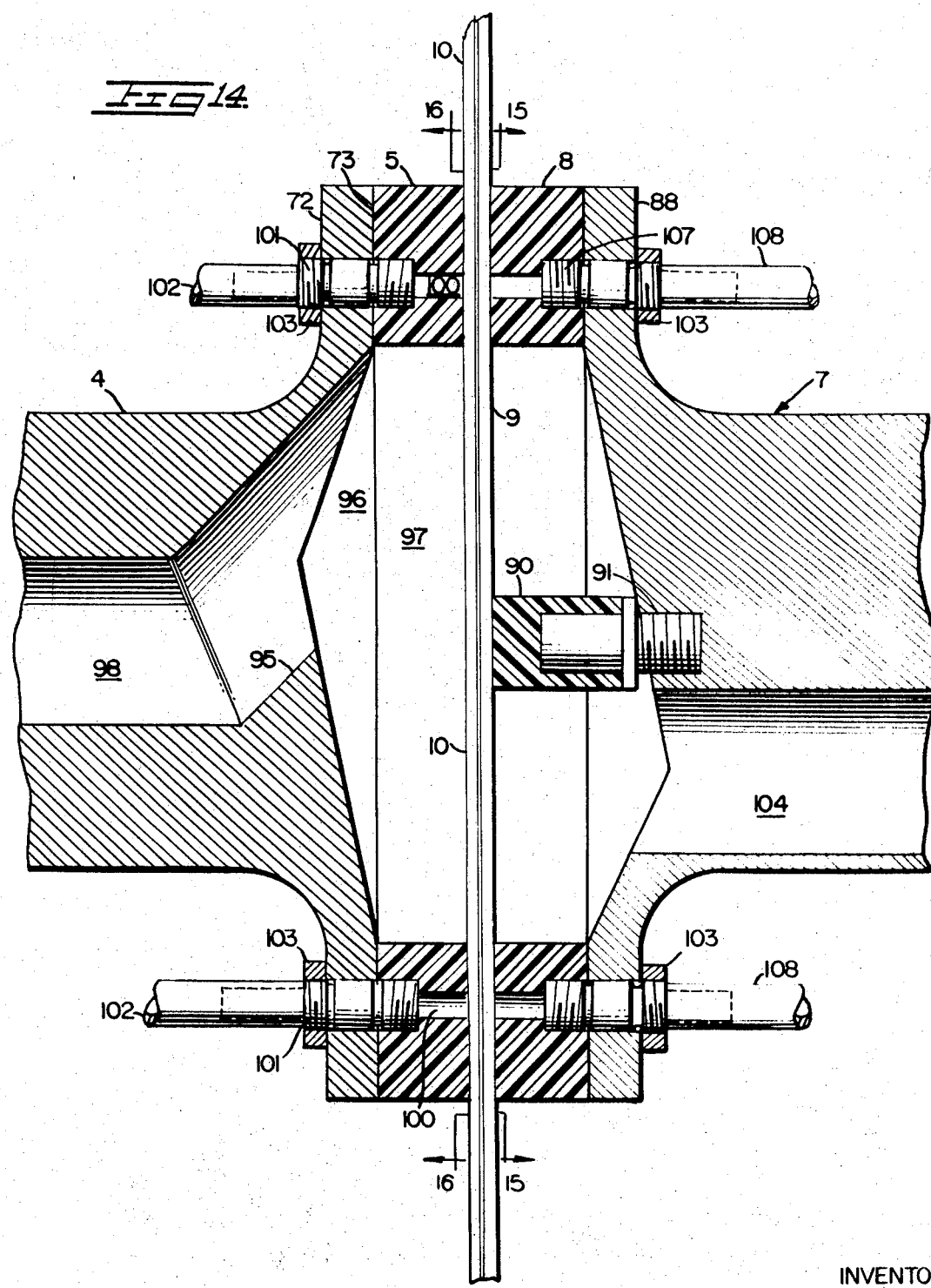

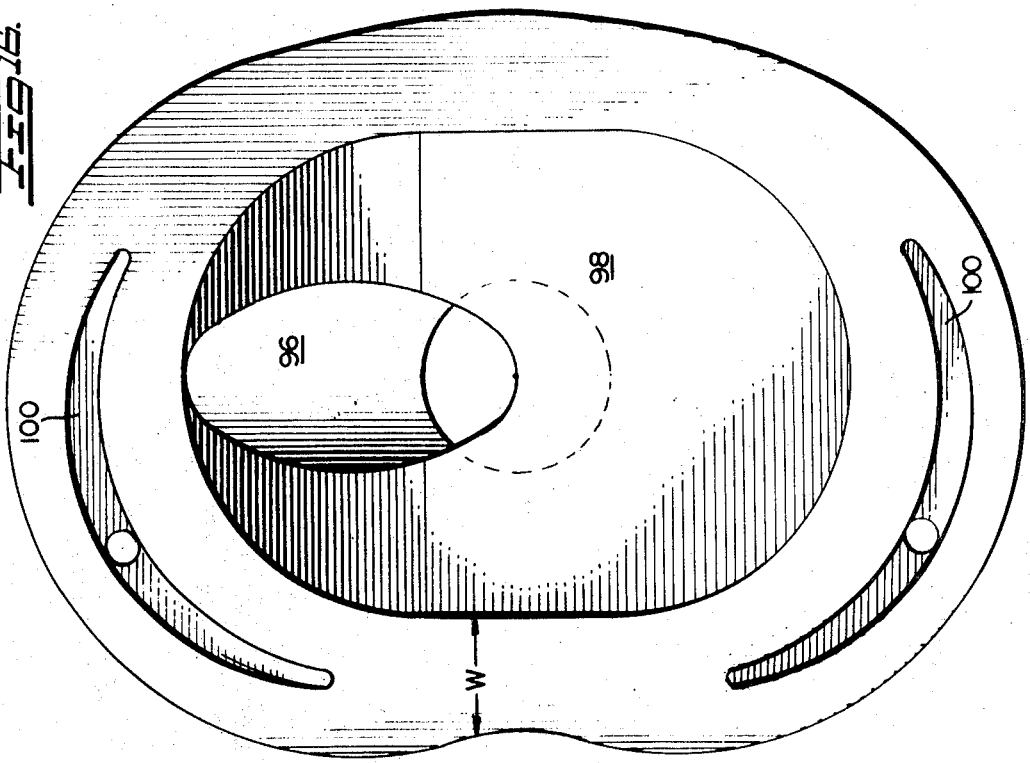
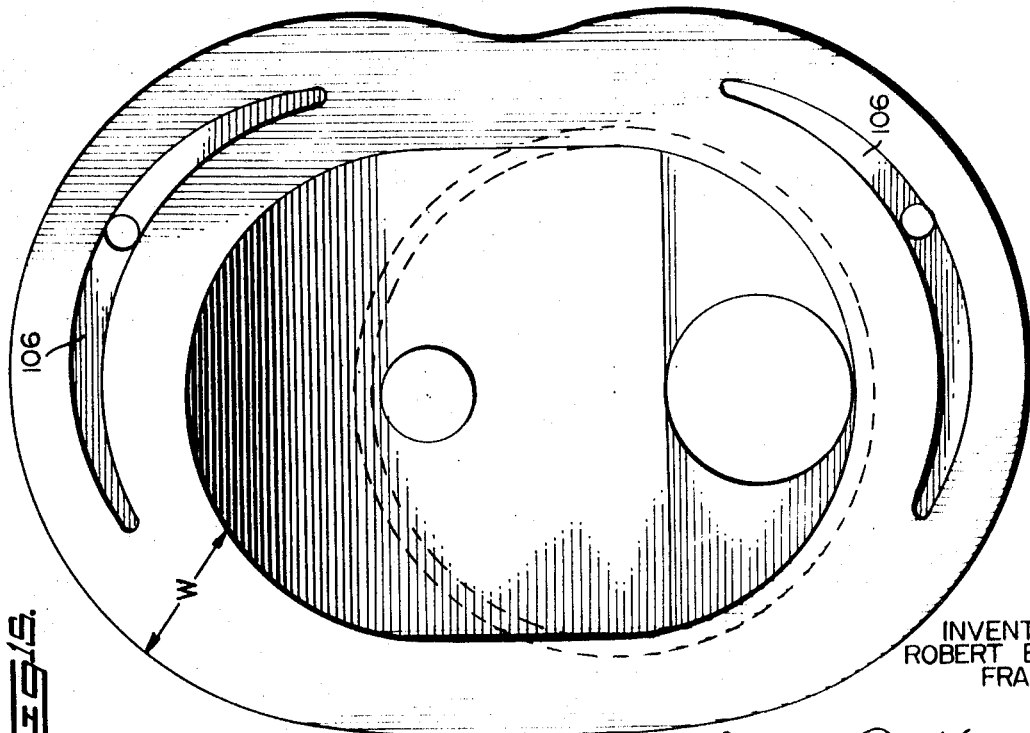

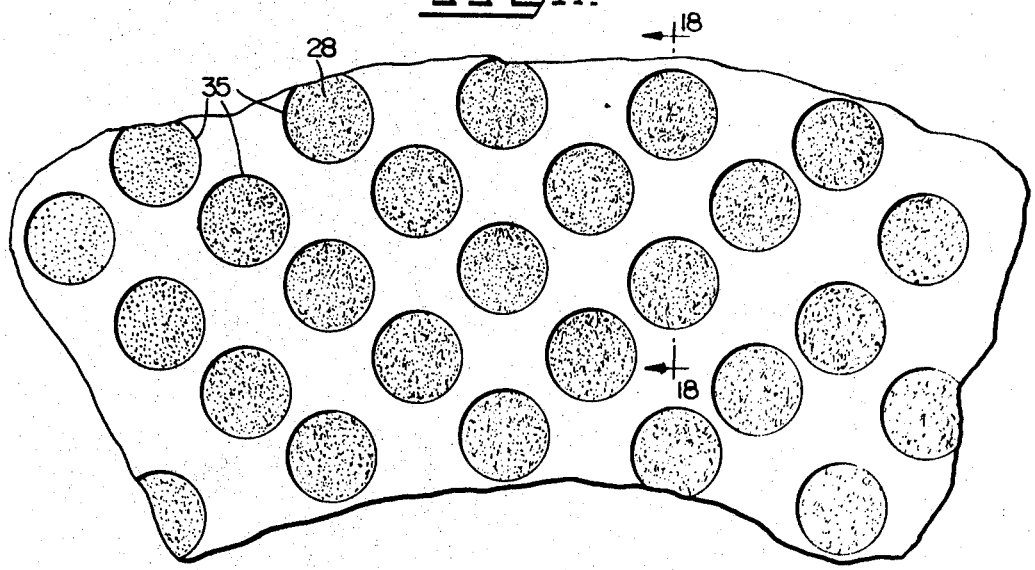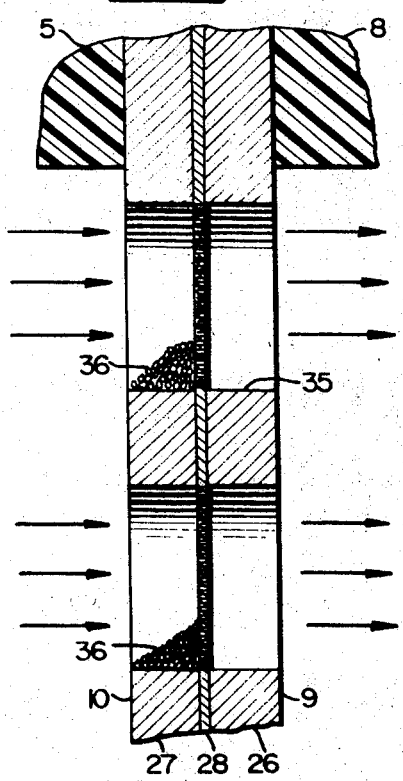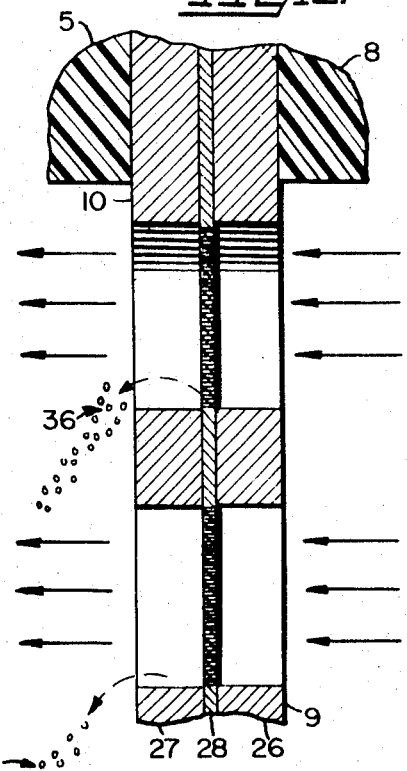

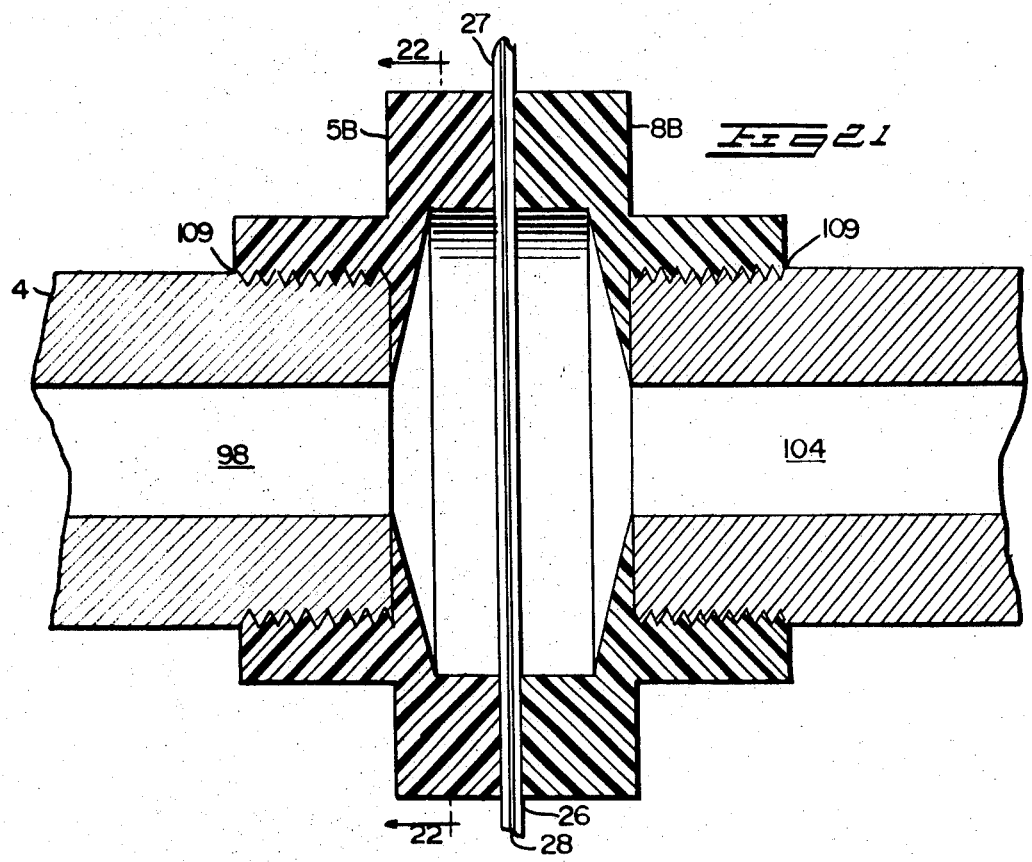
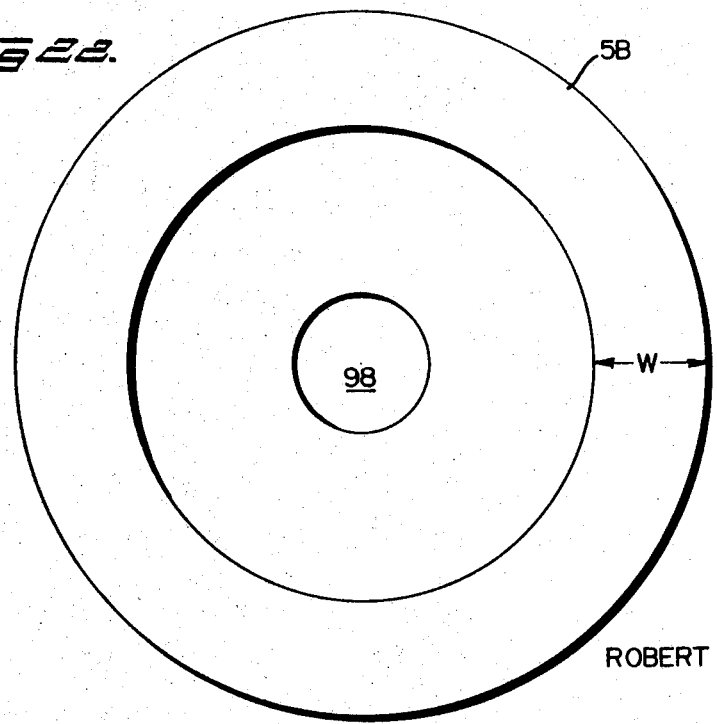

FILTERING APPARATUS AND METHOD

BACKGROUND OF THE INVENTION

This invention relates to a filtering apparatus and method. In a preferred embodiment this invention relates to a filtering apparatus and method particularly adapted for screening aqueous coating materials such as those employed in the coating of paper, in connection with which the invention will be described it being understood that it is not limited thereto.

Problems in handling coatings for coating paper include the accumulation in the coating of dirt, lumps, and fibers. These accumulations arise from several sources. For example, fibers build up in coatings in those systems where coating is circulated between a reservoir, to contact with the paper web to be coated, and then the excess from the paper coating operation is recirculated to the reservoir. Lumps occur from casein and other agglomerates built up during coating operations, particularly in connection with those circulating systems as previously described in this paragraph. Dirt comes from a number of sources including particles dislodged from pipes, dirt in the adhesive or pigment, and in some instances even includes dirt drawn from the web during the coating operation.

Coatings containing casein as an adhesive are particularly troublesome because of the wide variation in casein quality, e.g., cleanliness, rancidity, etc., often contributing to a large number of lumps. These derive largely from uncooked lumps, commonly called uncut casein. These lumps present particular problems in the screening of coatings because they quickly plug screens and cause spillage of the coating.

Coating losses in such operations are a major source of expense, pollution of natural resources, and have been difficult to bring under control because of, among other factors, difficulties in screening the coatings. Pertinent to the present invention are those losses of coating arising from the necessity to dump batches of coating because it is off-quality or because dirt, lumps and fiber have accumulated in the coating for reasons above stated, and spillage of coating arising from the plugging of screening apparatus or other filtering means.

It is an object of the present invention to provide a filtering apparatus for screening coatings. It is another object of the present invention to provide a method for screening coatings. It is still a further object of the invention to provide apparatus and method for screening coating materials under pressure.

Apparatus according to the present invention includes a rotatable disk filter with which liquidtight sliding seals are established opposite each other and on each side of the disk whereby coating can be passed through an inlet conduit past the inlet seal, disk filter, and past the outlet seal into an outlet conduit without loss of the liquid, and this despite the fact that the disk is moving through the conduits.

An advantage of apparatus constructed according to the present invention is that it is easily serviced, cleaned and adjusted.

Additional features and advantages of the present method are its extreme suitability for the filtering and screening of aqueous coatings containing casein.

Other objects, advantages and features will become apparent from the following description when read in conjunction with the drawings wherein:

FIG. 1 is a top plan view of the filtering apparatus.
FIG. 2 is a front elevational view of FIG. 1.
FIG. 3 is a side elevational view of FIG. 1.
FIG. 4 is a detailed vertical sectional view taken along the line 4—4 of FIG. 3.
FIG. 5 is an enlarged fragmentary vertical sectional view taken along the line 5—5 of FIG. 3.
FIG. 6 is an enlarged fragmentary elevational view of the ring gear and its associated components.
FIG. 7 is an enlarged detailed vertical sectional view taken along the line 7—7 of FIG. 6 showing the various parts in exploded assembly relationship.
FIG. 8 is an enlarged fragmentary vertical sectional view of the hub shown in FIG. 5.
FIG. 9 is a vertical sectional view taken along the line 9—9 of FIG. 8.
FIG. 10 is an exploded perspective view of the hub components seen in FIG. 8 and FIG. 9
FIG. 11 is an enlarged fragmentary sectional view of the disc-filter-bearing support.
FIG. 12 is an enlarged detailed vertical sectional view taken along the line 12—12 of FIG. 11.
FIG. 13 is an enlarged detailed vertical sectional view taken along the line 13—13 of FIG. 4.
FIG. 14 is an enlarged fragmentary vertical sectional view taken along the line 14—14 of FIG. 13.
FIG. 15 is a detailed vertical sectional view taken along the line 15—15 of FIG. 14.
FIG. 16 is a similar view taken along the line 16—16 of FIG. 14.
FIG. 17 is an enlarged fragmentary elevational view of the filtering screen.
FIG. 18 is an enlarged fragmentary sectional taken along the line 18—18 of FIG. 17, showing the collecting media for foreign particles.
FIG. 19 is a view similar to FIG. 18 showing the particle removal means.
FIG. 20 is a schematic view showing the filtering apparatus as employed within a system.
FIG. 21 is a modified arrangement of the seals and disc shown in FIG. 14 using circular flanges and wear plates.
FIG. 22 is a detailed sectional view taken along the line 22—22 of FIG. 21.

GENERAL

FIGS. 1–4 show an assembled screening apparatus 1 having a screen wheel assembly 2 mounted to rotate about the axis of a shaft 3 centrally located thereof. Offcenter on the screen assembly 2 is located an inlet conduit 4 that engages one face of the screen wheel with a liquidtight sliding seal 5. The inlet conduit is longitudinally adjustable in its position relative to the wheel 2 by means of the adjustment assembly 6.

An outlet conduit 7 is mounted on the other side of the screen wheel 2 opposite to the inlet conduit and sliding seal 4, 5 to receive the liquid emerging from the screen 2. Another liquidtight sliding seal 8 connects the outlet conduit with the downstream face of the screen wheel 9.

With the construction thus far described and with the inlet conduit properly positioned and pressed against the upstream face 10 of the screen wheel, it is possible to continuously screen coating materials under pressure. Pressures as high as 60 pounds per sq. in. gauge have been successfully experienced with practice of method and apparatus according to the present invention.

Backflushing means 11, 12 are provided to direct one or more streams of cleaning fluid back through the screening wheel assembly in a direction opposite to that which the coating passed through the screen. The backflushing means are located in the direction of screen wheel rotation so that the stream or streams of cleaning fluid hit the downstream face 9 of the screening wheel a few degrees after it has rotated through the sliding seals.

The screen wheel assembly has at its rim gear teeth 15 which connect with a driving means 16. In the illustrated embodiment, the driving means includes an electric motor 17, a gear speed reducer 18, and a driven sprocket 19 connected by a chain 20 to drive sprocket 21 on the output of the speed reducer, and a pinion gear 22 mounted on the same shaft with the driven sprocket in a position to engage the rim of the screen wheel.

In the embodiment of FIG. 3 the screen wheel rotates clockwise.

SCREEN WHEEL ASSEMBLY

FIGS. 4, 5 and 7 show the screen wheel assembly 2 as comprising a wheel 25 that defines the outer rim containing the gear teeth 15 or other driving means; two wheel disks 26, 27 mounted within the recessed face 25A of the wheel; a wheel screen 28 interposed between the two disks; an annular circular clamping ring 29 to hold the disks and screen against the wheel at the periphery of the assembly when rim bolts 30 are tightened; and a hub assembly 31 which in the preferred embodiment is formed to include the shaft 3 to which the wheel is fixedly secured. The shaft itself is mounted in a bearing 32 to one side of the shaft whereby a cantilever type of support is provided to the wheel assembly.

The wheel or rim is a circular annular ring having gear teeth 15 around its periphery for engaging the drive means 16. A recess 25A is formed on the inside of the wheel to receive the wheel plates and screen. The clamping ring also fits into the recess, as shown in FIG. 5, and is held in place by the plurality of bolts 30 that are screwed into the tapped holes 33 formed in the flange 34 that is at the back of the recess and which extends radially inwardly from the rim.

The wheel disk construction is most important. Each wheel disk 26, 27 presents outwardly a flat surface 9, 10 which has a plurality of perforations 35 in it. A purpose of the wheel disk is to provide mechanical support to the wheel screen. Purposes of the perforations 35 are (See FIGS. 17-19):

to provide passages for coatings to the wheel screen or screening element and to provide pockets in which the coating debris 36, or rejected material 36, or retained material 36 is carried past the liquidtight sliding seals 5, 8 which preferably are Teflon gaskets. Manifestly, the perforations 35 in one wheel disk are aligned (FIGS. 18, 19) with the perforations 35 in the other wheel disk so that a through passage is provided. When manufacturing the wheel disks it is convenient to clamp together the two plates of stainless steel from which they are formed and to drill both simultaneously so that the perforations and boltholes in both wheel disks are in perfect alignment.

The wheel screen 28 can be of any suitable screening material. In the practice of the invention thus far, stainless steel screens having meshes from 40 to 150 have been employed. Nylon or other suitable materials could likewise be used.

It often happens in coating operations that the type of coating used must be changed. This in turn may require a change in the screen, referring particularly to the wheel screen, to provide a larger or smaller mesh, whatever is the most suitable for the new type of coating. Accordingly, I have found it convenient to provide extra screen wheel assemblies 2 each assembly containing a screen 28 of a different mesh.

It is stressed that the outer face 9, 10 of each wheel disk is a flat plane (FIGS. 14, 17-19) and provides a flat plane between each hole or perforation 35 so that sealing engagement with the Teflon inlet and outlet seals 5, 8 is provided. The foraminous or perforated portion 38 (FIG. 13) of each wheel disk is annularly arranged, there being an imperforate portion 39 inwardly thereof adjacent the hub and another imperforate portion 40 outwardly thereof adjacent the rim. These imperforate portions provide continuous sliding engagement with the facing portions 41, 42 of the Teflon seals when the screen is operating.

The hub assembly 31 (FIGS. 8-12) comprises a shaft 3 having a retainer washer 45 and bolt 46 on its outside end to hold it in a Teflon bearing 47, inboard and outboard mandrels 48 and 49, and half hubs 50, 51. Inboard mandrel 48 preferably is integral with the shaft 3. The male half wheel hub 50 and female half wheel hub 51 are secured by a plurality of bolts 52 to opposite sides of the two disks. Tapped holes 53 in male hub 50 threadedly engage bolts 52. The wheel disks and hubs are mounted as a unit on the shaft, the heads of the bolts 52 fitting into recesses 54, 55 therefor in both of the mandrels. The outboard mandrel 49 is secured to the shaft by the bolt 57 which fits in the tapped hole 58 in the stub, or outboard, end 59 of the shaft 3. The two half hubs 50, 51 have a telescoping fit (FIGS. 5, 8) immediately adjacent the disks and shaft, thereby facilitating positioning of the wheel screen and hubs and the clamping thereof between the mandrels. Axial clearances 61, 62 between the telescoping hubs and the stub end and outboard mandrel, respectively, provide maximum clamping action and ease of assembly.

The shaft 3 is revolvably mounted with an axial floating fit in the Teflon bearing 47 (FIG. 11) whereby axial motion is possible to facilitate alignment with the Teflon seals 5, 8 particularly when the inlet conduit 4 and its associated seal 5 are being positioned by the adjusting means 6. As seen in FIGS. 11, 12 the Teflon bearing 47 is held in place by a split pillow block 64 which latter is secured together by a plurality of bolts 65 that engage tapped holes in the bottom half of the pillow block. The split pillow block, as will be seen below, permits quick disassembly and removal of the wheel disk assembly, including the shaft, its associated bearing, and obviously the wheel disks and rim. This quick-change feature facilitates changing screens when one desires to use a screen of a different mesh. The pillow block itself is mounted on a suitable bracket 66 which is in turn secured to the baseplate assembly 67.

The clamping ring 29 (FIG. 7) of the wheel disk assembly is an annular member having a plurality of boltholes 69 therein and of a size to be received snugly within the recess 25A in the wheel rim. Advantageously, the boltholes 69 through the clamping plate are countersunk so that the boltheads do not protrude. However, the countersinking feature may be omitted in those instances where it is deemed desirable to apply a box wrench to a bolthead for purposes of tightening or loosening.

Teflon as used herein refers to polytetrafluoroethylene, that is to a tetrafluoroethylene solid resin. The parts made thereof, such as seals and bearings may be either molded or machined, having been machined from a solid body of such resin in several instances.

CONDUITS AND ADJUSTING MEANS

As seen in FIGS. 3, 4, 13 and 14 the conduits 4 and 7 are located offcenter of the axis of wheel assembly rotation (i.e., offcenter of shaft 3) and engage only a defined portion of the wheel at any one time. The conduits and associated liquidtight sliding seals provide a closed pressuretight and liquidtight continuous passage from the inlet conduit, through the screening elements of the wheel assembly, and thence through the outlet conduit.

The inlet conduit 4 is moved by adjusting means 6 back and forth or toward and away from the face of the plate on the wheel disk assembly. The conduit itself comprises pipelike member 4 which is slidably supported in the bearing 71 for such movement toward and away form the screen. At the end of the conduit is a flange 72 upon which the Teflon gasket 5 comprising inlet conduit liquidtight sliding seal 5 is mounted. As illustrated in FIG. 13, this is a continuous ring of the flange shape which is secured to the flange, being liquidtight along the flange face 73, and then is pressed against the flat planar face 10 of the wheel disk to provide a sliding fit therewith.

The inlet conduit is positioned against the screen by way of the adjustment assembly 6 which is operated by the handcrank 75. The friction within and structure of assembly 6 hold the conduit 4 in the position to which it is moved. Turning the handcrank immediately rotates the worm gear 76 which is mounted in the fixed support housing 77. The worm gear in turn rotates a ring gear 78 which is secured to a nut 79 that engages the threads 80 on the outside of the conduit. Rotation of the handcrank, as is evident, causes the conduit to either be moved toward the wheel disk assembly 2 or away from it by sliding in the inlet conduit support bearing 71. Referring to FIGS. 1, 2, and 4 the bearing is held in the pillow block 82 which is secured to the baseplate 67 of the entire assembly closely adjacent the place where the adjustment assembly is secured thereto.

The outlet conduit 7 is constructed in a similar fashion but is not adjustable in its position. Instead, a fixed body support 84 is provided. When assembling the machine, the outlet conduit 7 is positioned by loosening bolts and nuts 85 of the fixed body support, letting journal bearing portion 86 of the conduit float axially in the body support bearing 87 when the wheel assembly 2 is put into place, and then pushing the outlet conduit against its corresponding face of the wheel disk and tightening the bolts 85 in the fixed body support to clamp the conduit.

As illustrated in FIG. 4, the outlet conduit comprises a short circuit 7 that is fitted into a fixed body support 84, the latter in turn being secured to the baseplate 67 of the entire machine. On the end of the conduit adjacent the wheel assembly is a flange 88 corresponding in shape and size to that of the inlet conduit. Secured to the face of the flange is a Teflon outlet seal 8.

The outlet conduit of FIGS. 13 and 14 also provides a center support 90 for that portion of the screen that is within the seals 5, 8. This center support comprises a bolt screwed into a tapped hole in the outlet conduit and having a Teflon pad 90 on the outer head of the bolt. The bolt is, as illustrated located so that the Teflon pad engages the face 9 of the downstream wheel disk, thereby supporting the same against bulging or bending which may occur in those instances of high pressure differential occurring across the screen.

The inlet and outlet conduit flanges 72, 88 and corresponding seals 5, 8 can be of any shape. I have made them in a circular shape (as shown in FIGS. 21, 22) of 20 square inches flow area but in the embodiment of FIGS. 13—16 I have used a kidney shape in order to get a larger flow area of 30 square inches, that is, in order to enclose a larger portion of the wheel disk assembly. The inlet and outlet seals are both made of Teflon, each have a kidney shape, and correspond in shape to that of the flat part of the flange on which they are respectively mounted. The seal means 5, 5B, 8, 8B of FIGS. 13, 15, 16, and 21 is a solid resin preferably polytetrafluoroethylene and in all events is ring-shaped. The ring has an annular width W that is larger than each of said perforations whereby there is no pressure or flow path past the seals 5, 8 via the perforations 35 because the seal means 5, 8 blanks off the perforations — thus the sliding seal effect is realized in the foraminous region. The conduits and for that matter the sliding seals 5, 5B, 8, 8B are not secured in any way to the screen although there is the sliding seal connection.

BACKFLUSHING MEANS

The backflushing means 11 (FIG. 1-3) is located closely adjacent the inlet and outlet conduits 4, 7. Backflushing means 11 may include a prewetting system 90 to add moisture to the retained debris, thus keeping it from getting so hard it can't be washed out before the actual backflushing operation takes place. In FIG. 3 the prewet system 90 is a faucet connected to a suitable water supply and adjusted to give a small trickle of water on the upstream face 10 of the wheel assembly. The backflushing itself (FIGS. 17-19) occurs by spraying a stream of fluid, which can be water, air or steam, through the wheel disk assembly in a direction opposite to that of the liquid flow through the conduits, i.e., the backflushing takes place in the direction going from the outlet or downstream wheel disk to the inlet or upstream wheel disk. The backflushing action dislodges the debris 36 from within the perforations 35 (FIGS. 18, 19) the debris falls into a trough 12, thence to a drain or other waste disposal means 91.

I prefer to use water in my backflushing operations as the first fluid stream to clean the wheel disk. If it is desired to have a second backflushing stream more water or air is preferred to be used. On occasion, steam may be employed. When casein-adhesive-based aqueous coatings are being screened it is preferred to prewet in the manner illustrated in FIG. 3 using water to backflush with a strong stream of hot water about 140° F. and then at the second backflushing head or means 11 to apply a stream of air in the backflushing direction.

The flexibility of this structure, particularly since the wheel operates in the open, permits adding as many backflushing means as may be desirable, including the use of special chemical washes and baths should that be necessary, in the course of cleaning up the screen before it is returned to within the conduits for further screening operations.

In the embodiment shown I have a backflushing head comprising a pipe closed at each end with a plurality of holes therein on that side of the pipe adjacent the wheel disk. At the middle of the pipe is a T connection leading to a source of water supply. The backflushing head for the air shower would be similarly constructed except the T would lead to a source of compressed air. Similarly, the head for steam would be constructed as described for water but the T connection would lead to a source of steam supply.

OTHER

I prefer to make most of my screening apparatus out of stainless steel to eliminate corrosion problems. This is particularly true when handling aqueous coatings. However, the bearings for mounting the wheel disk assembly and for slidably supporting the inlet conduit may be made of a suitable low-friction material suitable for bearings, such as bronze, although Teflon is preferred. As already described, the inlet and outlet seals are made of a suitable low-friction material suitable for bearings, advantageously Teflon. The drive train is preferably made of corrosion-resistent materials, but if well lubricated with oil and grease, ordinary steel parts can be employed because the drive train is not continuously wet.

Referring to FIG. 14, the inlet conduit 4 has internal flow-distributing means consisting in the sharp-edged rib 95 and the eccentric entry 96 into the expansion chamber 97 to enhance the evenness of flow distribution and minimize the tendency of solid particles to fall out upon entering chamber 97. The entry 96 has the same cross-sectional area as the passageway 98 in the conduit 4 and strikes obliquely downward from near the top of flange 72 into full communication with passage 98 to thereby form rib 95.

When installed, as shown in FIG. 4 and FIG. 13, this construction is used with the kidney-shaped seals and arranged with the rib 95 at the bottom of the flow passage. The expansion chamber 97 is, as illustrated, formed by the volume within the open part of the seal 5 and the adjacent part of the flange 72.

Should coating under pressure tend to leak between the face 10 and the seal 5, recovery grooves 100 (see FIG. 16) are provided at an intermediate position on the face of the seal 5. The intermediate position intercepts or lies across the direction of movement of the wheel assembly past the seal. Studs 101 are hollow, secure the seal 5 to the flange, and provide a passageway from the recovery groove 100 to a coating conduit 102. The conduit 102 conveys coating to a reservoir upstream of inlet conduit 4 for recirculation and may comprise a piece of rubber tubing pushed over the smooth unthreaded outer end of stud 101. The stud 101 is like a short nipple and threadedly engages a suitably tapped hole in the seal 5 is held in place by a locknut 103 screwed on that part of the stud which extends outside of the flange 72. The bolthole in the flange is not threaded.

The outlet conduit 7 has already been partially described in relation to the center support 90. The outlet conduit, as illustrated, has a passageway 104 which is offset from the entryway 96 of the inlet conduit, thereby forcing the fluid to be screened to use as many as possible of the perforations 35 when traveling through the screen assembly. The Teflon seal 8 is constructed like the mirror image of the inlet seal 5, has recovery grooves 106, and is held in place by hollow studs 107 and locknuts 103 and flexible tubing or other suitable conduit 108 to convey coating to a suitable place. It should be noted that the coating recovered through the conduits 108 may be added to the already screened coating inasmuch as it has already been screened.

FIGS. 21 and 22 show a different embodiment of the liquid-type sliding seals having a circular cross section instead of the kidney cross section described above. Also, FIGS. 21, 22 embodiment has no separate flange but instead has integral seals and flanges. The seals designated as 5B and 8B are each made of one piece of Teflon which is attached by any suitable means such as the threaded connection 109 to the respective inlet and outlet conduits 4, 7. The respective seals 5B and 8B can be made alike.

FIG. 20 illustrates a typical continuous screening system where a screen according to this invention is incorporated into a coating system. Coating circulates from a reservoir or stand tank 120 through a conduit 121 to a pump 122. The pump forces the coating into the delivery line 124 thence into the inlet conduit 4. The delivery line 124 is connected to conduit 4 by any conventional means such as the hose-type connection 126 illustrated in FIGS. 4 and 20. The coating passes through the inlet conduit, the screen 28, the outlet conduit 7 and into a screened coating line 128 which conveys the coating to a conventional coating apparatus 129 of any known construction shown here as comprising the rolls 130 and coating pan 131. The rolls 130 apply the coating to a web of paper in known fashion. Coating, containing debris, e.g., fibers, dirt and other undesirable materials, leaves the coating apparatus by a drain line 132 and is delivered to the stand tank or reservoir 120.

In actual operation using a variety of typical papermaking coatings, a screen 1 ran for 54 days employing an electric motor 17 having 2 hp., turning the wheel assembly 2 at a speed of ⅛ r.p.m. At the end of 54 days the unit was taken out of service for inspection and to permit testing another unit in that location, but not because of malfunction. No coating deposits had built up within perforations 35, the screen 28 was still serviceable and had little, if any, deposits of material therein. The screen used during this test was 100 mesh and the perforated annular portion of the disks had an inner diameter of 7½ inches, an outer diameter of 16½ inches, perforations of 3/16-inch diameter, and a disk thickness of ⅛ inch. Circular seals 5B, 8B were used and had an inner diameter of 5 inches.

Thus the method of the invention as applied to screening a liquid comprises the steps of directing said liquid through a closed flow path comprising a closed inlet conduit, a screen, a closed outlet conduit, and liquidtight sliding seals between each said conduit and its corresponding screen face; continuously moving said screen between said seals out of said flow path and simultaneously advancing new screen into said flow path; and providing the upstream face of the screen with a flat surface having perforations therethrough whereby the major portion of the debris is removed while in said perforations from the flow path through said seals to without said flow path in response to said moving step. Backflushing to remove debris is preferably used.

Where an aqueous coating containing adhesive and pigment is to be screened, the method comprises the steps of directing said coating through a closed flow path comprising a closed inlet conduit, a screen, a closed outlet conduit, and liquidtight sliding seals between each said conduit and its corresponding screen face; moving said screen out of said flow path and simultaneously advancing new screen into said flow path; and backflushing the screen to remove the debris with a stream of water traveling through the screen in a direction opposite to that traveled by the coating through the screen in said directing step; the upstream face of the screen having a flat surface with perforations therethrough whereby the major portion of the debris is removed from the flow path through said seals to without said flow path.

The invention claimed is:

1. A filtering apparatus comprising
a revolvable screen having flat perforated outer faces with flat surfaces between the perforations;
first and second closed conduits for, respectively, delivering material to be filtered to a portion of the screen and removing filtered material from such portion, said conduits being not secured to said screen and being opposite each other on opposite sides of said screen; and
inlet and outlet ring-shaped seal means of low-friction material respectively mounted directly on the end of each of said first conduit and said second conduit and maintained in sliding contact with the adjacent flat screen face for providing a liquidtight sliding seal and flow path through the central portion of the ring between each said conduit and the corresponding face of said screen, the annular width of said seal means being larger than each of said perforations.

2. Filtering apparatus of claim 1 wherein each said seal means comprises a polytetrafluoroethylene body.

3. Filtering apparatus of claim 1 further comprising means for adjustably positioning one of said sliding seal means against the corresponding face of said screen.

4. A filter apparatus according to claim 1 wherein said screen has an annular foraminous region containing said perforations and impermeable regions diametrically inwardly and outwardly thereof, all regions being coplanar with said faces and concentric and coaxial with the axis about which said screen is revolvable; and
said seal means each engage said screen in an area extending from one impermeable region across said foraminous region to the other impermeable region, said flow path through said seal means being in fluid communication with each other through said foraminous region.

5. A filter apparatus according to claim 1 wherein said screen further comprises
a circular screen element surrounded by a rim;
drive means to rotate said screen by drivingly engaging a part of the rim of said screen.

6. A filter apparatus according to claim 1 wherein said screen further comprises
first and second foraminous plates each presenting outwardly a flat face for engaging said seal means, the perforations in said faces being spaced apart by a flat planar surface;
a wheel screen interposed between said plates; and
means to fasten together the plates and wheel screen.

7. A filtering apparatus according to claim 1 further comprising
backflushing means for directing a stream of fluid through said screen in a direction opposite to that of the material being screened by said filter screen,
there being a nonenclosed path of communication surrounding said backflushing and sliding seal means.

8. Filtering apparatus of claim 1 wherein said seal means is a solid resin body.

9. A filtering apparatus comprising
a revolvable screen having flat perforated outer faces with flat surfaces between the perforations;
first and second closed conduits for, respectively, delivering material to be filtered to a portion of the screen an removing filtered material from such portion, said conduits being not secured to said screen and being opposite each other on opposite sides of said screen;
inlet and outlet seal means respectively connected between each of said conduits and the adjacent flat screen face for providing a liquidtight sliding seal and flow path between each said conduit and the corresponding face of said screen; and
backflushing means for directing a stream of fluid through said screen in a direction opposite to that of the material being screened by said filter;
said seal means each comprising a ring-shaped polytetrafluoroethylene body secured directly to the end of each said conduit and held in sliding contact against said screen, said body having an annular width larger than the perforations in said flat outer surfaces.

10. A method of continuously screening liquid comprising
directing said liquid through a closed flow path comprising a closed inlet conduit, a screen, a closed outlet conduit, and a ring-shaped sliding seal of low-friction material mounted on the end of each conduit between each said conduit and its corresponding screen face;

continuously moving said screen between said seals out of said flow path and simultaneously advancing new screen into said flow path;

providing the upstream face of the screen with a flat surface having perforations therethrough whereby the major portion of the debris is removed while in said perforations from the flow path through said seals to without said flow path in response to said moving step, said perforations being smaller than the annular width of said seals; and positioning, with an adjustable positioning means, at least one of said seals to maintain it in sliding engagement with the corresponding screen face.

11. The method of claim 10 further comprising directing a backflushing stream of fluid through said screen element in a direction opposite to that of the material being screened by said filter.

12. The method of claim 11 further comprising flowing a softening agent into contact with said debris.

13. A method of continuously screening an aqueous coating containing pigments and adhesives comprising directing said coating through a closed flow path comprising a closed inlet conduit, a screen, a closed outlet conduit, and a ring-shaped liquidtight sliding seal of solid resin mounted directly on the end of each said conduit in sliding contact with its corresponding screen face;

moving said screen out of said flow path and simultaneously advancing new screen into said flow path; and backflushing the screen to remove the debris with a stream of water traveling through the screen in a direction opposite to that traveled by the coating through the screen in said directing step;

the upstream face of the screen having a flat surface with perforations therethrough whereby the major portion of the debris is removed from the flow path through said seals to without said flow path, said perforations being smaller than the annular width of said seals.

14. A method according to claim 13 that further includes trickling water onto the debris retained on the upstream face of said screen thereby to prewet said debris.

* * * * *